United States Patent
Lee et al.

(10) Patent No.: US 8,331,292 B2
(45) Date of Patent: Dec. 11, 2012

(54) METHOD FOR MAPPING CONTROL CHANNELS

(75) Inventors: Jung Hoon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 289 days.

(21) Appl. No.: 12/744,577

(22) PCT Filed: Dec. 12, 2008

(86) PCT No.: PCT/KR2008/007379
§ 371 (c)(1),
(2), (4) Date: May 25, 2010

(87) PCT Pub. No.: WO2009/078628
PCT Pub. Date: Jun. 25, 2009

(65) Prior Publication Data
US 2010/0260057 A1     Oct. 14, 2010

Related U.S. Application Data

(60) Provisional application No. 61/013,645, filed on Dec. 14, 2007.

(30) Foreign Application Priority Data

Nov. 19, 2008   (KR) .................. 10-2008-0115075

(51) Int. Cl.
*H04Q 7/00* (2006.01)
*H04J 3/06* (2006.01)

(52) U.S. Cl. ....................................... 370/328; 370/503

(58) Field of Classification Search .................. 370/328, 370/503
See application file for complete search history.

(56) References Cited

U.S. PATENT DOCUMENTS

| | | | |
|---|---|---|---|
| 2007/0076587 A1 | 4/2007 | Kwon et al. | |
| 2007/0149132 A1* | 6/2007 | Li et al. | 455/67.11 |
| 2007/0171864 A1 | 7/2007 | Zhang et al. | |
| 2009/0046650 A1* | 2/2009 | Dalsgaard et al. | 370/329 |
| 2009/0088148 A1* | 4/2009 | Chung et al. | 455/423 |
| 2009/0116573 A1* | 5/2009 | Gaal et al. | 375/267 |
| 2009/0147744 A1* | 6/2009 | Dottling et al. | 370/329 |
| 2010/0260115 A1* | 10/2010 | Frederiksen et al. | 370/329 |
| 2012/0020321 A1* | 1/2012 | Higuchi et al. | 370/330 |

FOREIGN PATENT DOCUMENTS

WO    WO 2007/029965 A1    3/2007

* cited by examiner

*Primary Examiner* — Andrew Lee
(74) *Attorney, Agent, or Firm* — Birch, Stewart, Kolasch & Birch, LLP

(57) ABSTRACT

A method for mapping control channels is discussed. This mapping method according to an embodiment includes calculating a control channel mapping start time of each cell according to the number of control channel groups allocated to each cell, and performing mapping of repetition of the control channel at intervals of a predetermined distance in order to acquire a diversity gain, wherein the mapping begins from the control channel mapping start time. In this case, control channels of several groups are transmitted in each cell. Thus, a resource allocation method during transmission of control channels (e.g., PHICH and PCFICH) is improved such that interference between neighboring cells can be reduced, resulting in the improvement of a control channel throughput.

11 Claims, 8 Drawing Sheets

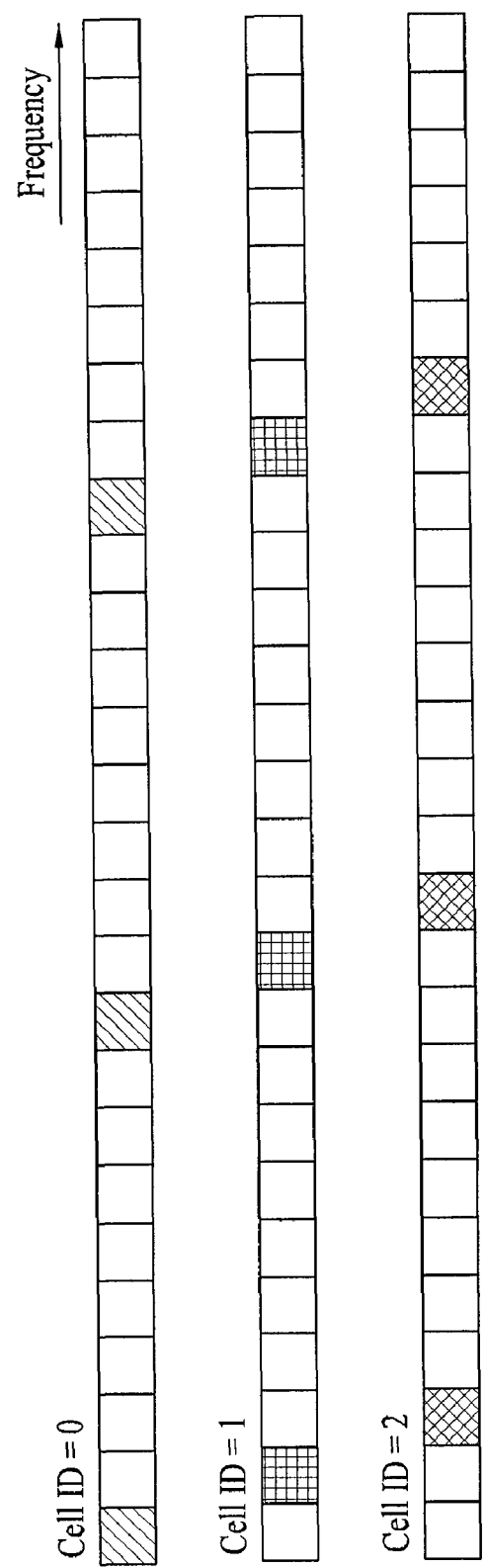

METHOD FOR MAPPING CONTROL CHANNELS

This application is the National Phase of PCT/KR2008/007379 filed on Dec. 12, 2008 which claims priority under 35 U.S.C. 119(e) to U.S. Provisional Application No. 61/013,645 filed on Dec. 14, 2007 and under 35 U.S.C. 119(a) to Patent Application No. 10-2008-0115075 filed in Korea on Nov. 19, 2008, all of which are hereby expressly incorporated by reference into the present application.

TECHNICAL FIELD

The present invention relates to a cellular OFDM wireless packet communication system, and more particularly to a method for mapping a frequency of a signal applied to a downlink and an OFDM symbol area in the cellular OFDM wireless packet communication system.

BACKGROUND ART

When a mobile communication system transmits and receives packets, a receiver must inform a transmitter of the success or failure of packet reception. If the success of packet reception is decided, the receiver transmits an acknowledgment (ACK) signal to the transmitter, such that the transmitter starts transmitting new packets. Otherwise, if the failure of packet reception is decided, the receiver transmits a non-acknowledgment (NACK) signal to the transmitter, such that the transmitter retransmits old packets (i.e., previous packets) related to the NACK signal. This operation is referred to as an automatic repeat request (ARQ).

This ARQ operation is combined with a channel coding scheme, such that a hybrid ARQ (HARQ) is proposed. The HARQ scheme combines each retransmitted packet with pre-received packet, and reduces an error rate, such that it can increase the efficiency of an overall system. In order to increase a system throughput, the HARQ requires faster ACK/NACK responses from the receiver as compared to the conventional ARQ operation. Therefore, the HARQ scheme transfers the ACK/NACK responses according to a physical channel signaling scheme. The HARQ implementation method can be generally classified into two methods. A first method is a Chase Combining (CC) method, and allows retransmitted packets to have the same modulation method and the same coding rate in the same manner as in pre-transmitted packets. A second method is an incremental redundancy (IR) method, and allows such retransmitted packets to have another modulation method and another coding rate different from those of the pre-transmitted packets. In this case, a receiver can increase a system throughput by means of a coding diversity.

A multicarrier cellular mobile communication system allows terminals contained in one or more cells to transmit uplink data packets to a base station. The terminals are able to transmit uplink data packets in one subframe, such that the base station should be capable of transmitting ACK/NACK signals to the terminals in a subframe also. If the base station performs CDM-multiplexing within some time-frequency domains of a downlink transmission band of the multicarrier system on several ACK/NACK signals transmitted to terminals within the single subframe, ACK/NACK signals about other terminals are distinguished by an orthogonal code or a Quasi-orthogonal code multiplied in the time-frequency domain. Also, if QPSK transmission is carried out, the above ACK/NACK signals can be distinguished from each other by different orthogonal phase components.

If each ACK/NACK signal is CDM-multiplexed and transmitted to transmit several ACK/NACK signals within a single subframe, there are needs for downlink radio channel response characteristics not to be greatly changed in a time-frequency domain because orthogonality between different CDM-multiplexed ACK/NACK signals is maintained, such that a satisfactory reception throughput can be acquired although a specialized reception algorithm such as a channel equalizer is not used.

CDM multiplexing of the ACK/NACK signals must be carried out in a time-frequency domain in which a radio channel response is not greatly changed. However, if a radio channel quality of a specific terminal is poor in a time-frequency domain to which the ACK/NACK signal is transmitted, an ACK/NACK reception throughput of the terminal may be greatly deteriorated.

Therefore, the ACK/NACK signal transmitted to an arbitrary terminal within a single subframe is repeatedly transmitted over time-frequency domains distributed on several time-frequency axes. The ACK/NACK signals transmitted to other terminals are CDM-multiplexed in each time-frequency domain, such that a reception end is able to acquire a time-frequency diversity gain in receiving the ACK/NACK signals.

DISCLOSURE OF THE INVENTION

Technical Problem

Accordingly, the present invention is directed to a method for mapping control channels that substantially obviates one or more problems due to limitations and disadvantages of the related art.

An object of the present invention is to provide a control channel mapping method for improving a resource allocation method during control channel transmission, thereby reducing interference between neighboring cells.

Technical Solution

To achieve these objects and other advantages and in accordance with the purpose of the invention, as embodied and broadly described herein, A method for mapping control channels on a frequency axis repeatedly at regular intervals includes: calculating a control channel mapping start time of each cell according to the number of control channel groups allocated to each cell; and performing mapping of repetition of the control channel at intervals of a predetermined distance in order to acquire a diversity gain, wherein the mapping begins from the control channel mapping start time.

The calculating of the control channel mapping start time may include: determining a control channel mapping start time of each cell using a maximum value among group numbers of control channel allocated to each cell.

The calculating of the control channel mapping start time may include: determining a control channel mapping start time of each cell using an average value of group numbers of control channels allocated to each cell.

The calculating of the control channel mapping start time may include: determining the channel allocation start time according to the number of groups of control channels of neighboring cells.

The calculating of the control channel mapping start time may include: determining the control channel mapping start time using an equation of $k_0 = ((\lfloor N_{ID}^{cell}/N_{cell} \rfloor + (N_{ID}^{cell} \bmod N_{cell}) \cdot \lfloor N/(N_{cell} \cdot N_{rep}) \rfloor) \bmod N$, in which N is the number of unit resources capable of being allocated for control channel transmission, $N_{cell}$ is the number of cells capable of minimally reducing an amount of interference, $N_{rep}$ is the number of repetition times performed by the control channel transmission, and $N_{ID}^{cell}$ is a physical-layer cell identity.

The performing of the mapping of the repetition of the control channel may include: determining an i-th repetition position of the control channel using an equation of $p_i = k_0 + i \cdot \lfloor N/N_{rep} \rfloor$, (i=0, 1, ..., $N_{rep}$−1).

The performing of the mapping of the repetition of the control channel may include: determining an i-th repetition position of the control channel using an equation of $p_i = k_0 + \lfloor (i \cdot N)/N_{rep} \rfloor$, (i=0, 1, ..., $N_{rep}$−1).

The performing of the mapping of the repetition of the control channel may include: mapping the control channel repetition to the positions of remaining resource elements other than a position of a resource element allocated to a reference signal and a physical control format indicator channel (PCFICH).

The performing of the mapping of the repetition of the control channel may include: mapping the control channels of the several groups to neighboring positions in each cell.

The control channel may be a physical HARQ indication channel (PHICH).

The control channel may be a physical control format indicator channel (PCFICH) related to control channels of each downlink, when a plurality of downlinks exist.

Advantageous Effects

According to embodiments of the present invention, the present invention improves a resource allocation method during transmission of control channels (e.g., PHICH, PCFICH), and reduces interference between neighboring cells, such that it improves a throughput of the control channels.

DESCRIPTION OF DRAWINGS

The accompanying drawings, which are included to provide a further understanding of the invention, illustrate embodiments of the invention and together with the description serve to explain the principle of the invention.

In the drawings:

FIG. 1A is a conceptual diagram illustrating a method for increasing a resource for PHICH transmission in proportion to an increasing cell ID on a one-by-one basis;

MODE FOR INVENTION

Figure 1B:
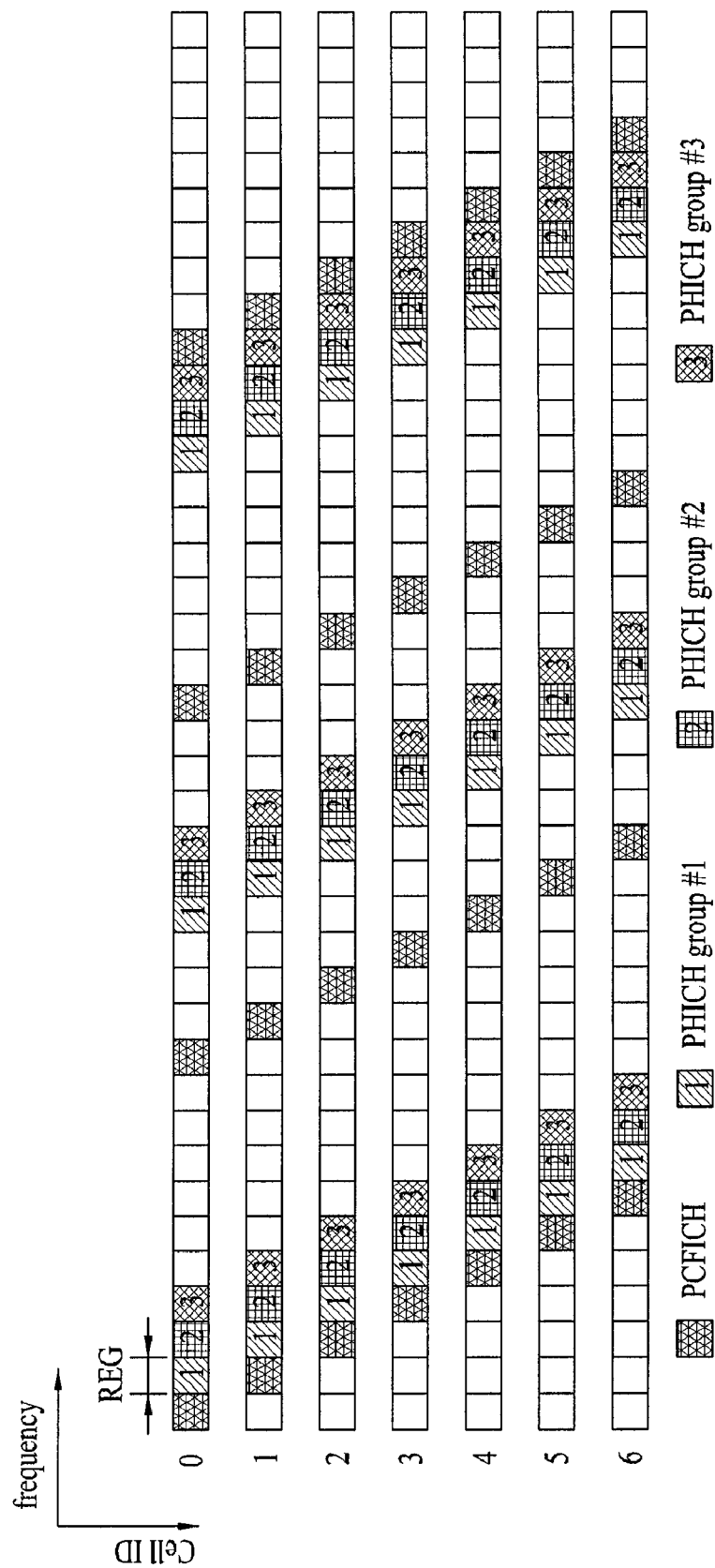
FIG. 1B shows three PHICH groups of each cell.

Reference will now be made in detail to the preferred embodiments of the present invention, examples of which are illustrated in the accompanying drawings. The following embodiments of the present invention may be modified into various formats, and the scope of the present invention is not limited to only the following embodiments and can also be applied to other examples.

According to the following scheme, control channels transmitted via one OFDM symbol are uniformly distributed to all frequency bands, and at the same time individual channels can be repeatedly transmitted via different frequency domains. Specifically, a method for transmitting a Physical Hybrid ARQ Indicator Channel (PHICH) used for ACK/NACK transmission in a 3GPP LTE system will be exemplarily described in detail. However, the present invention is not limited to this example, but it can be applied to not only the PHICH but also arbitrary control channels.

If a cellular communication system has several cells, these cells are distinguished by unique numbers of individual cells, for example, a cell ID. It is important to enhance a throughput of PHICH transmission by minimizing interference caused by PHICH transmission between cells during PHICH transmission, because the PHICH is used as an important channel for transmitting ACK/NACK information. In this case, if time-frequency resources for PHICH transmission are differently allocated according to cell IDs, the above-mentioned interference between cells (i.e., inter-cell interference) can be reduced.

In case of the 3GPP LTE system, a physical-layer cell-identity $N_{ID}^{cell}$ can be represented by the following equation 1:

$$N_{ID}^{cell} = 3 N_{ID}^{(1)} + N_{ID}^{(2)} \quad \text{[Equation 1]}$$

In Equation 1, $N_{ID}^{(1)}$ is a physical-layer cell-identity group, and has values of 0~167. $N_{ID}^{(2)}$ is a physical-layer identity contained in each cell group, and has values of 0~2. Different orthogonal codes of a reference signal and different root sequence indexes of a primary synchronization signal (PSCH) are allocated according to the value of $N_{ID}^{(2)}$. Therefore, different physical-layer identities $N_{ID}^{(2)}$ contained in the same physical-layer cell-identity group $N_{ID}^{(1)}$ are generally allocated among neighboring cells. As shown in Equation 1, $N_{ID}^{cell}$ is represented by a combination of $N_{ID}^{(1)}$ and $N_{ID}^{(2)}$, such that it has values of 0~503. As a method for reducing interference caused by PHICH transmission between neighboring cells, time-frequency resources for PHICH transmission between neighboring cells may be allocated in different ways. For example, time-frequency resource for PHICH transmission may be differently allocated according to cell identities.

FIG. 1A is a conceptual diagram illustrating a method for increasing a resource for PHICH transmission in proportion to an increasing cell ID on a one-by-one basis.

In FIG. 1A, if a cell identity increases by one, a resource for PHICH transmission increases by one, such that this resource increases in proportion to the increasing cell identity on a one-by-one basis. In this way, the resource for PHICH transmission is allocated to individual cells in different ways. A small-sized square with a pattern represents a CDM-multiplexed resource unit created after several PHICHs are spread out on several resource elements (REs) by an orthogonal or a Quasi-orthogonal code. That is, the small-sized square having the pattern represents a resource unit used for transmitting the PHICH group. In FIG. 1A, in order to acquire a frequency diversity, PHICH groups are spaced apart from each other at intervals of a predetermined distance in an overall system frequency band, and at the same time are repeatedly arranged. In FIG. 1A, each PHICH group is repeated three times and the repeated result is transmitted. As described above, if a resource for PHICH transmission is differently allocated according to a cell identity, the interference between cells can be greatly reduced, such that a PHICH transmission throughput can be improved. However, if each cell has a plurality of terminals, the number of PHICH groups which must be transmitted by each cell may be a plural number.

FIG. 1B shows three PHICH groups of each cell.

PHICH groups in a specific cell may be successively allocated to be adjacent to resources which have been used for transmission by a first PHICH group. According to the above-mentioned scheme, resources of several PHICH groups can be simplified. However, in this case, interference among several PHICH groups located between neighboring cells may occur.

Figure 2:
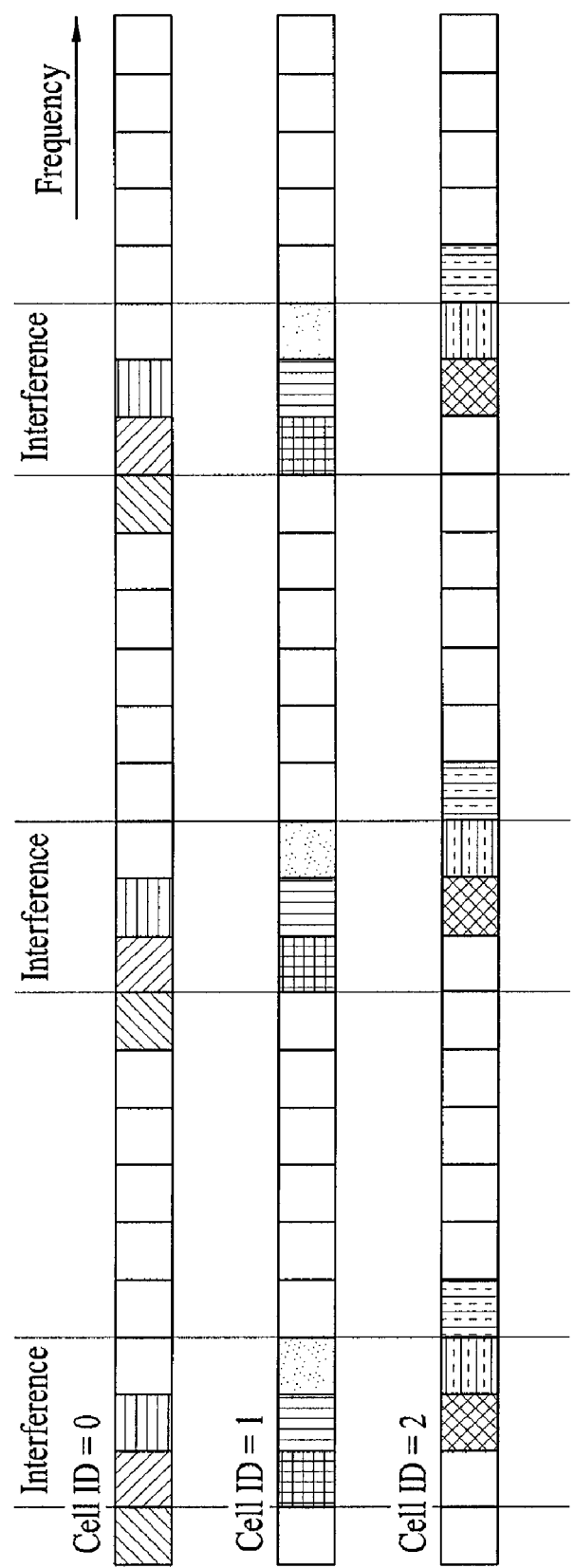
FIG. 2 is a conceptual diagram illustrating interference between cells when several PHICH groups are successively allocated to each cell.

FIG. 2 is a conceptual diagram illustrating interference between cells when several PHICH groups are successively allocated to each cell. That is, resources for PHICH transmission between cells overlap with each other when several PHICH groups are successively allocated to individual cells, such that the interference between cells occurs.

Different physical-layer identities $N_{ID}^{(2)}$ contained in the same physical cell-identity group $N_{ID}^{(1)}$ are allocated between neighboring cells, a cell identification (hereinafter referred to as a cell ID) between the neighboring cells may be successively allocated by the above equation 1. Generally, interference between neighboring cells reaches the highest level, such that a deterioration of a PHICH transmission throughput may occur.

According to the following method, a resource allocation interval for PHICH transmission between consecutive cell IDs is adaptively adjusted to solve the above-mentioned problem, such that the following method is able to mitigate the interference between cells although several PHICH groups are allocated as consecutive resources to individual cells.

Figure 3:
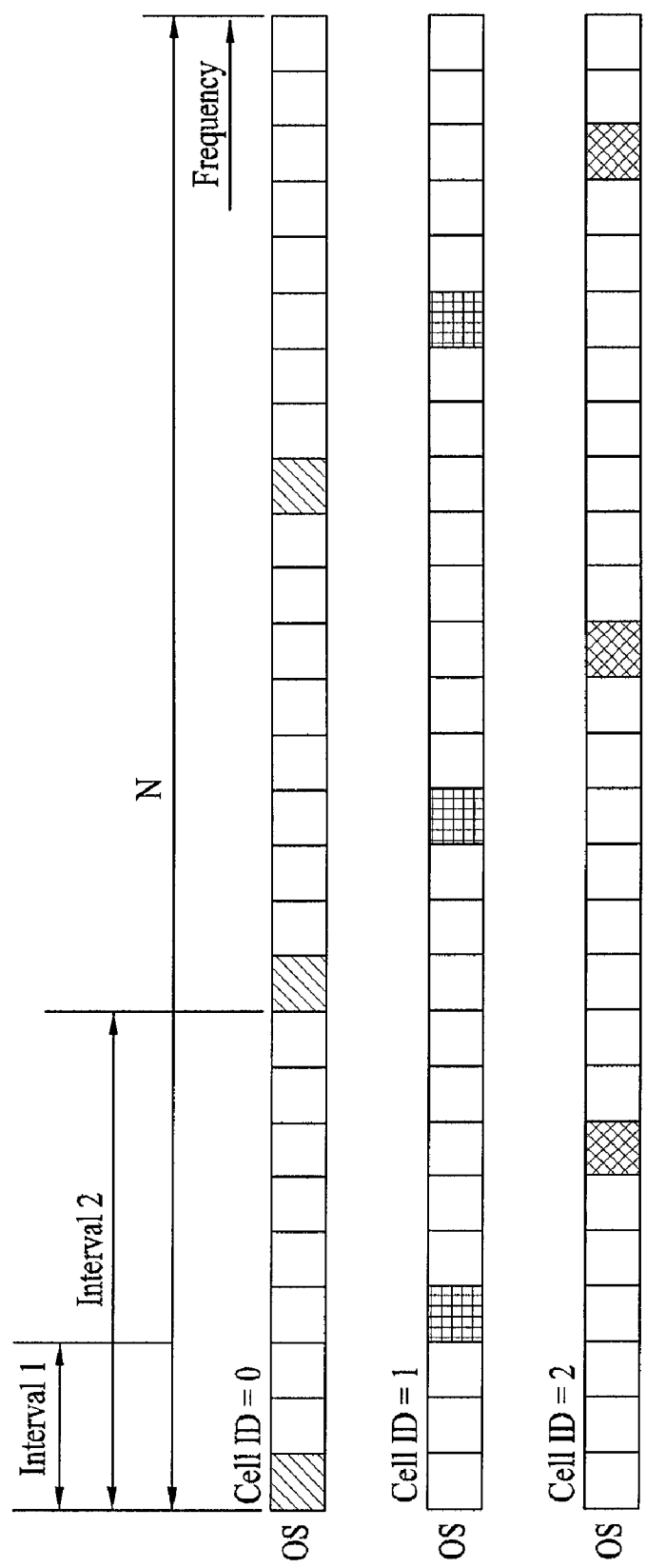
FIG. 3 is a conceptual diagram illustrating a resource allocation method for transmitting a PHICH in each cell according to one embodiment of the present invention.

FIG. 3 is a conceptual diagram illustrating a resource allocation method for transmitting a PHICH in each cell according to one embodiment of the present invention.

Each cell (Cell ID of 0, 1, or 2) transmits each PHICH group three times. The frequency interval repeated in each cell is set to '9' (i.e., Interval 2), an interval for resources for transmitting a PHICH between cells is set to '3' (i.e., Interval 1), and finally resource allocation is carried out. In this case, although each cell transmits several PHICH groups, no interference problem of FIG. 2 occurs.

Figure 4:
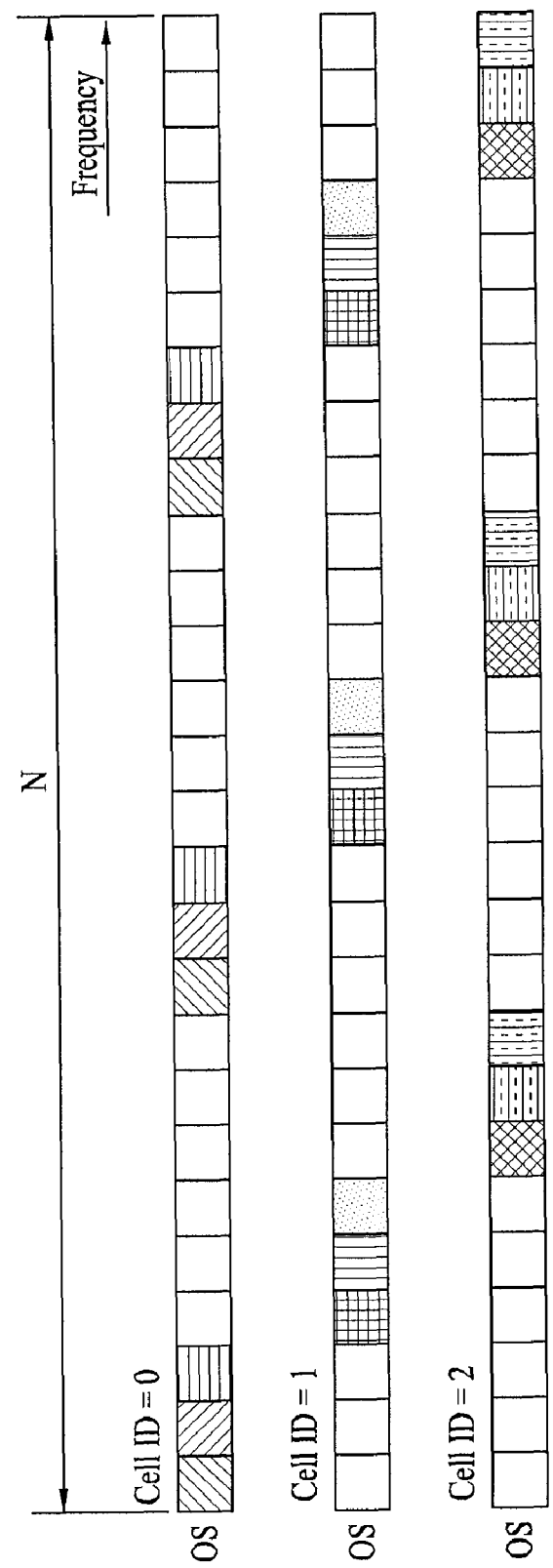
FIG. 4 is a conceptual diagram illustrating a method for transmitting several PHICH groups in each cell according to the allocation result of FIG. 3.

FIG. 4 is a conceptual diagram illustrating a method for transmitting several PHICH groups in each cell according to the allocation result of FIG. 3.

The easiest way for transmitting several PHICH groups within the same cell is to transmit another PHICH group to a neighboring resource just next to an old resource which has been used to transmit a previous PHICH group. Differently from FIG. 2, FIG. 4 has no interference between cells. If the number of PHICH groups desired to be transmitted by each cell is 4 or higher, the aforementioned interference occurs. However, it should be recognized that the level of this interference of FIG. 4 can be less than that of FIG. 2. That is, a PHICH transmission throughput can be improved.

The above-mentioned contents can be represented by the following equation 2. This equation 2 represents a method for allocating resources for transmitting a PHICH between neighboring cells at regular intervals.

$$k_0 = ((\lfloor N_{ID}^{cell}/N_{cell} \rfloor + (N_{ID}^{cell} \bmod N_{cell}) \cdot \lfloor N/(N_{cell} \cdot N_{rep}) \rfloor) \bmod N$$ [Equation 2]

In Equation 2, N is the number of unit resources capable of being allocated for PHICH transmission, $N_{cell}$ is the number of cells capable of minimally reducing an amount of interference, and $N_{rep}$ is the number of repetition times of the PHICH which is repeatedly transmitted to acquire a diversity gain. First of all, a control channel start time $k_0$ is determined according to cell IDs $N_{ID}^{cell}$, $N_{cell}$, and $N_{rep}$.

A position $p_i$ of a unit resource to which an actual PHICH group is transmitted is determined by the following equation 3 on the basis of the $k_0$ value.

$$p_i = k_0 + i \cdot \lfloor N/N_{rep} \rfloor, \text{ or } p_i = k_0 + \lfloor (i \cdot N)/N_{rep} \rfloor (i=0,1,\ldots,N_{rep}-1)$$ [Equation 3]

If resources for PHICH transmission are allocated according to the above equation 3, FIG. 3 shows a case of parameters, i.e., N=27, $N_{cell}$=3, $N_{rep}$=3, and $N_{ID}^{cell}$=0, 1, 2. That is, the allocation of FIG. 3 is carried out by considering only the PHICH resource among three cells. If the number of cell IDs is 4 or higher, the PHICH resource may be allocated to be adjacent to the old resource, which has been allocated to the last group of a previous cell, in proportion to an increasing cell ID.

Figure 5:
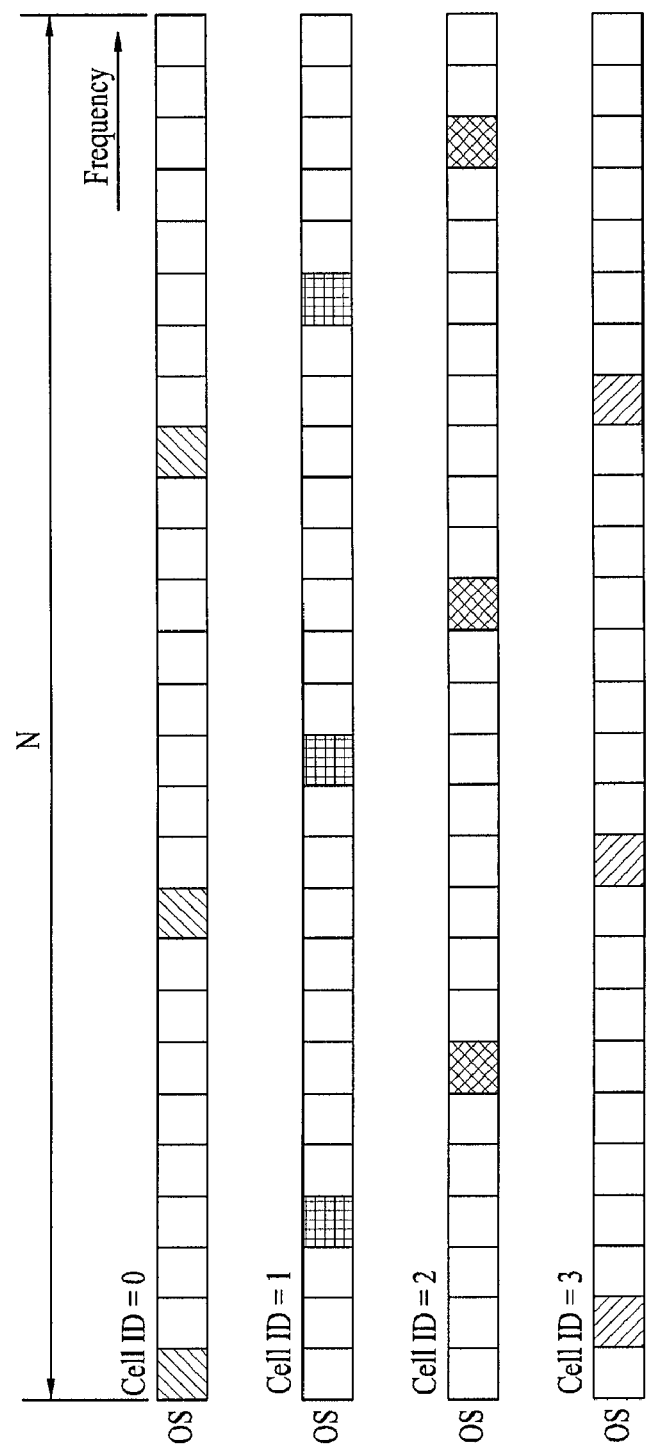
FIG. 5 is a conceptual diagram illustrating a method for allocating resources to four cells when there are three cells achieving a minimum interference amount.

FIG. 5 is a conceptual diagram illustrating a method for allocating resources to four cells when there are three cells achieving a minimum interference amount. Referring to FIG. 5, a PHICH group of a specific cell having a cell ID '3' may receive resources adjacent to other resources allocated to a cell having a cell ID '0'. If $N_{cell}$ is set to '4' (i.e., $N_{cell}$=4), resources are allocated at intervals of a predetermined distance in which interference among four cells is minimized. FIGS. 4 and 5 show only examples for better understanding of the present invention, such that the present invention can be applied to other examples regardless of N, $N_{cell}$, and $N_{rep}$ values. Parameters of Equations 2 and 3 are used for only illustrative purposes of the present invention, and other parameters having the same concept can be used.

Figure 6:
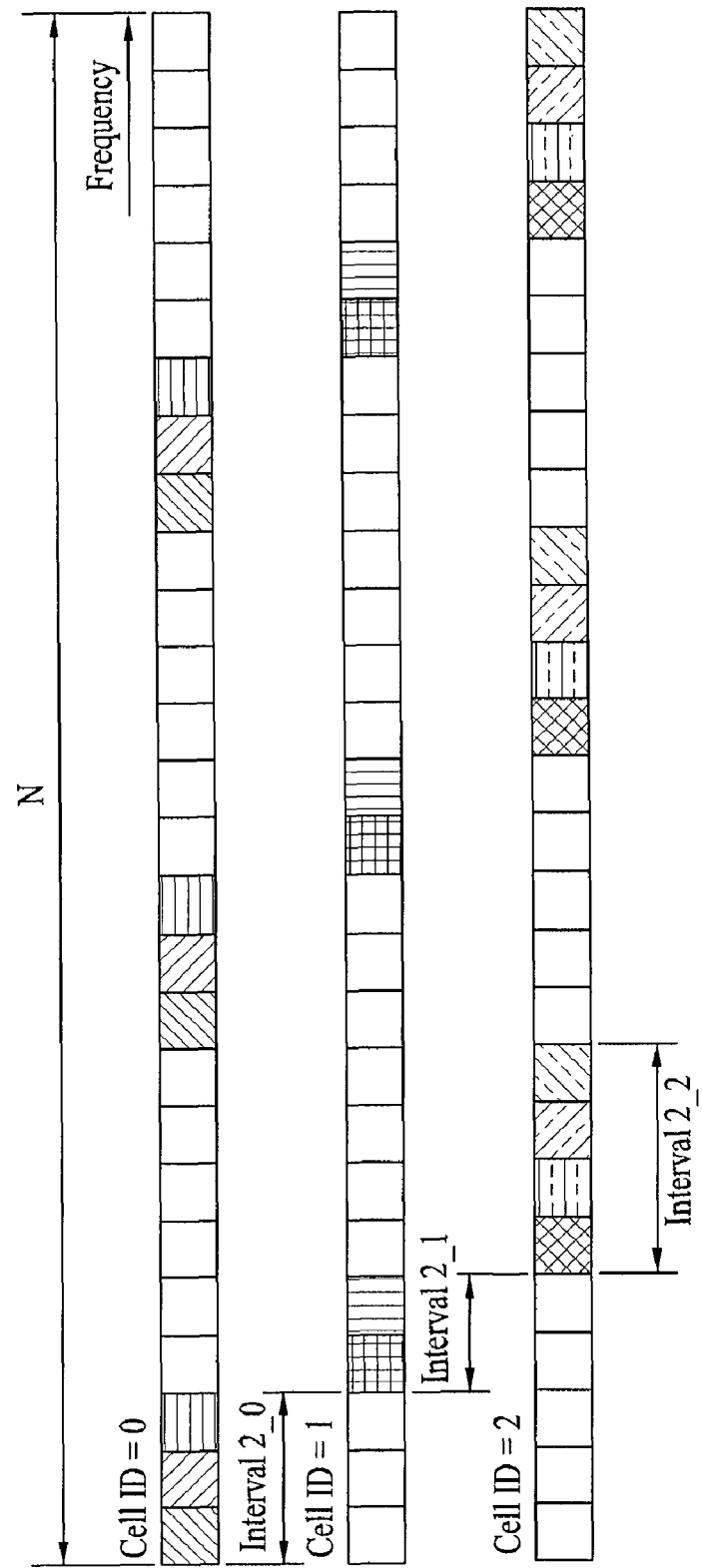
FIG. 6 is a conceptual diagram illustrating a method for differently applying an interval between control channel mapping start times to individual cells.

FIG. 6 is a conceptual diagram illustrating a method for differently applying an interval between control channel mapping start times to individual cells.

It is assumed that the number of PHICH groups transmitted to each cell is differently decided in FIG. 6. The method of FIG. 2 does not maintain the same allocation interval (i.e., Interval 2_1, Interval 2_2, or Interval 2_3) of resources for PHICH transmission between neighboring cells, and adjusts a control channel mapping start time between the neighboring cells in consideration of the number of PHICH groups transmitted by each cell. As can be seen from FIG. 6, if an interval between cells is adjusted in consideration of the number of groups actually transmitted by each cell, resources can be more effectively used as compared to the other case in which the same interval is applied to all cells.

Specifically, in Equation 2, the value of $\lfloor N/(N_{cell} \cdot N_{rep}) \rfloor$ is used to adjust an allocation interval of resources for PHICH transmission between neighboring cells. This $\lfloor N/(N_{cell} \cdot N_{rep}) \rfloor$ value may be replaced with another value which corresponds to either the number of PHICH groups transmitted by each cell according to situations or a maximum number of PHICH groups transferable by each cell.

If the above-mentioned contents are represented by parameters used by the 3GPP LTE system, the following result is acquired.

A PHICH mapping position is determined in consideration of the relationship between neighboring cells according to the $N_{ID}^{cell}$ value. This PHICH may be mapped to four consecutive resource elements (k,i) which are unmapped to reference symbols and a Physical Control Format Indicator Channel (PCFICH) in the increasing order of 'i' and 'k' values.

In the following description, it is assumed that y(0), . . . , y(3), y(4), . . . , y(7), y(8), . . . , y(11) may indicate symbols which are spread out at a spreading factor (SF) of 4, such that a CDM-multiplexed PHICH group is repeated three times and then the repeated result is transmitted.

In the following description, $N_{RB}^{DL}$ is the number of downlink resource blocks to which the resources can be mapped by a total system, and $N_{sc}^{RB}$ is the number of resource elements for each resource block.

The mapping of $y(0), \ldots, y(3)$ to be mapped to four consecutive resource elements may begin from a resource element of the position The mapping of $y(4), \ldots, y(7)$ may begin from a resource element of the position $k=k_0+\lfloor 2N_{RB}^{DL}/3 \rfloor \cdot N_{sc}^{RB}/2$. The mapping of $y(8), \ldots, y(11)$ may begin from a resource element of the position $k=k_0+\lfloor 2N_{RB}^{DL}/3 \rfloor \cdot N_{sc}^{RB}/2$.

For another example, the mapping of $y(0), \ldots, y(3)$ to be mapped to four consecutive resource elements may begin from a resource element of the position $k=k_0$. The mapping of $y(4), \ldots, y(7)$ may begin from a resource element of the position $k=k_0+\lfloor 2N_{RB}^{DL}/3 \rfloor \cdot N_{sc}^{RB}/2$. The mapping of $y(8), \ldots, y(11)$ may begin from a resource element of the position $k=k_0+\lfloor 4N_{RB}^{DL}/3 \rfloor \cdot N_{sc}^{RB}/2$.

The above-mentioned control channel mapping start time $k_0$ can be represented by the following equation 4, 5, or 6.

$$k_0=(N_{sc}^{RB}/2) \cdot ((\lfloor N_{ID}^{cell}/3 \rfloor + (N_{ID}^{cell} \bmod 3) \cdot \lfloor 2N_{RB}^{DL}/9 \rfloor) \bmod 2N_{RB}^{DL}) \text{ or } k_0=(N_{sc}^{RB}/2) \cdot ((N_{ID}^{(1)}+N_{ID}^{(2)}N_{PHICH}^{max}) \bmod 2N_{RB}^{DL}) \quad \text{[Equation 4]}$$

$$k_0=(N_{sc}^{RB}/2) \cdot ((\lfloor N_{ID}^{cell}/3 \rfloor + (N_{ID}^{cell} \bmod 3)N_{PHICH}^{max}) \bmod 2N_{RB}^{DL}) \text{ or } k_0=(N_{sc}^{RB}/2) \cdot ((N_{ID}^{(1)}+N_{ID}^{(2)}N_{PHICH}^{max}) \bmod 2N_{RB}^{DL}) \quad \text{[Equation 5]}$$

In Equation 5, $N_{PHICH}^{max}$ is a maximum number of resource elements needed for PHICH transmission of each cell, and this value can be acquired by system information.

$$k_0=(N_{sc}^{RB}/2) \cdot ((\lfloor N_{ID}^{cell}/3 \rfloor + (N_{ID}^{cell} \bmod 3)N_{PHICH,i}) \bmod 2N_{RB}^{DL}) \text{ or } k_0=(N_{sc}^{RB}/2) \cdot ((N_{ID}^{(1)}+N_{ID}^{(2)}N_{PHICH,i}) \bmod 2N_{RB}^{DL}) \text{[Equation 6]}$$

The result of each addition shown in Equations 4~6 continuously increases in proportion to an increasing cell ID.

However, resources capable of being actually mapped are limited in a frequency band of a system, relates to a modular operation of the value $N_{RB}^{DL}N_{sc}^{RB}$ indicating an actual mapping position such that the values acquired by the above equations do not escape from a mapping-available position of the frequency band of the system. $N_{RB}^{DL}N_{sc}^{RB}$ is a total number of actually-mappable positions. In Equation 6, $N_{PHICH,i}$ is the number of resource elements actually used for PHICH transmission at each cell 'i', and this $N_{PHICH,i}$ value may be changed to another value in each cell. The number of used resource elements may be determined and decided by each base station.

Symbols $y(0), \ldots, y(11)$ begin from the resource element index decided by the k value, and are mapped to four consecutive resource elements (e.g., a reference signal (RS) and a Physical control format indicator channel (PCFICH)) unused for transmission by other signals.

The $k_0$ value in Equations 4 to 6 is determined by the $N_{ID}^{cell}$ value. In this case, if an index denoted by the $k_0$ value collides with an index of a resource element which uses a reference signal and a PCFICH, an index which increases by '1' one by one until the $k_0$ value meets a resource element index unused for transmitting the reference signal and the PCFICH may be applied. Also, if an index of one PHICH group is decided, the next PHICH group is adjacent to an index used for a previous PHICH group, and is allocated to four consecutive resource elements unused for the resource signal and the PCFICH.

The present invention can be applied to not only the PHICH but also other control channels.

Figure 7:
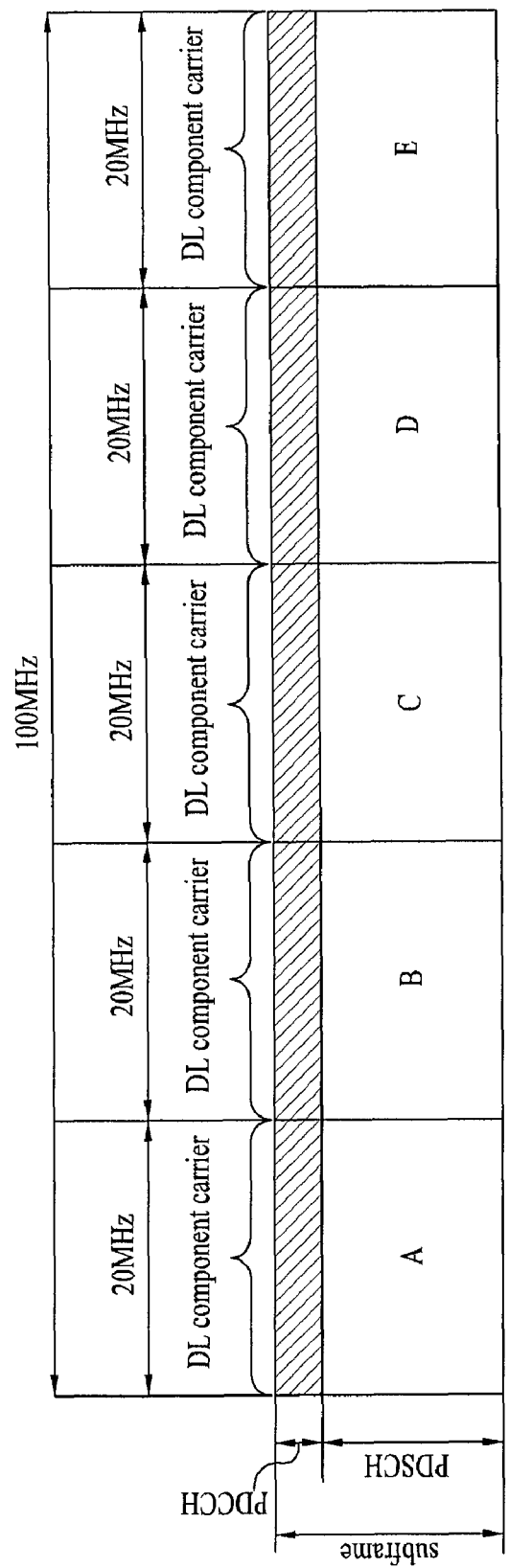
FIG. 7 is a conceptual diagram illustrating a method for transmitting several PCFICHs in one cell according to one embodiment of the present invention present invention.

FIG. 7 is a conceptual diagram illustrating a method for transmitting several PCFICHs in one cell according to the present invention.

If one cell includes a plurality of downlinks, there is a need to transmit PCFICHs indicating the number of OFDM symbols used for a control channel transmitted to each downlink. If only a corresponding PCFICH is transmitted to each downlink, the terminal must gain access to all downlinks to recognize PCFICH information of each downlink, and must receive the PCFICH information. In this case, a power consumption of the terminal may be unexpectedly increased, such that control channels of a designated specific downlink may be received before the terminal receives data. For the convenience of description, this downlink is called a primary component carrier. In this case, the terminal may receive only the control channels at the primary component carrier, and may decide which one of the downlinks will be used for data reception according to this control channel information. The primary component carrier may be decided according to terminals. Although a specific component carrier is not equal to the primary component carrier of one terminal, this specific component carrier may be set to another terminal's primary component carrier. Control channels are transmitted to all downlinks, such that there is needed PCFICH information indicating the number of OFDM symbols transmitting this control channel.

If one terminal attempts to receive data transmitted to several downlinks using only control channel information at a primary component carrier, PCFICH information for each downlink must be recognized, such that the number of OFDM symbols transmitting data (except for control channels) to each downlink can be recognized. Therefore, another embodiment of the present invention provides a method for further transmitting PCFICH information of another downlink to only one primary component carrier.

If it is assumed that a component carrier C is called a primary component carrier in FIG. 7, this component carrier is also able to transmit the remaining PCFICH information of A, B, D, and E. In this way, in the case where one cell includes several component carriers, several PCFICH information units may be transmitted. In this case, the above-mentioned mapping method can be applied to this case.

Although the above-mentioned embodiments have exemplarily disclosed the PCFICH, it should be noted that the present invention can also be applied to other control channels except for the PCFICH.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

INDUSTRIAL APPLICABILITY

As apparent from the above description, the present invention provides a method for mapping a frequency of a signal applied to a downlink and an OFDM symbol area in the cellular OFDM wireless packet communication system.

What is claimed is:

1. A method for mapping control channels on a frequency axis repeatedly at regular intervals, the method comprising:

calculating a control channel mapping start time of each cell according to the number of control channel groups allocated to each cell; and performing mapping of repetition of the control channel at intervals of a predetermined distance in order to acquire a diversity gain, wherein the mapping begins from the control channel mapping start time.

2. The method according to claim 1, wherein the calculating of the control channel mapping start time includes:

determining a control channel mapping start time of each cell using a maximum value among group numbers of control channel allocated to each cell.

3. The method according to claim 1, wherein the calculating of the control channel mapping start time includes:

determining a control channel mapping start time of each cell using an average value of group numbers of control channels allocated to each cell.

4. The method according to claim 1, wherein the calculating of the control channel mapping start time includes:

determining the channel allocation start time according to the number of groups of control channels of neighboring cells.

5. The method according to claim 1, wherein the calculating of the control channel mapping start time includes:

determining the control channel mapping start time using an equation of $k_0 = ((\lfloor N_{ID}^{cell}/N_{cell} \rfloor + (N_{ID}^{cell} \mod N_{cell}) \cdot \lfloor N/(N_{cell} \cdot N_{rep}) \rfloor) \mod N$, in which N is the number of unit resources capable of being allocated for control channel transmission, $N_{cell}$ is the number of cells capable of minimally reducing an amount of interference, $N_{rep}$ is the number of repetition times performed by the control channel transmission, and $N_{ID}^{cell}$ is a physical-layer cell identity.

6. The method according to claim 5, wherein the performing of the mapping of the repetition of the control channel includes:

determining an i-th repetition position of the control channel using an equation of $p_i = k_0 + i \cdot \lfloor N/N_{rep} \rfloor$, (i=0, 1, ..., $N_{rep}-1$).

7. The method according to claim 5, wherein the performing of the mapping of the repetition of the control channel includes:

determining an i-th repetition position of the control channel using an equation of $p_i = k_0 + i \cdot \lfloor N/N_{rep} \rfloor$, (i=0, 1, ..., $N_{rep}-1$).

8. The method according to claim 5, wherein the performing of the mapping of the repetition of the control channel includes:

mapping the control channel repetition to the positions of remaining resource elements other than a position of a resource element allocated to a reference signal and a physical control format indicator channel (PCFICH).

9. The method according to claim 1, wherein the performing of the mapping of the repetition of the control channel includes:

mapping the control channels of the several groups to neighboring positions in each cell.

10. The method according to claim 1, wherein the control channel is a physical HARQ indication channel (PHICH).

11. The method according to claim 1, wherein the control channel is a physical control format indicator channel (PCFICH) related to control channels of each downlink, when a plurality of downlinks exist.

* * * * *